(12) United States Patent
Chetlur et al.

(10) Patent No.: US 9,152,220 B2
(45) Date of Patent: Oct. 6, 2015

(54) INCREMENTAL PREPARATION OF VIDEOS FOR DELIVERY

(75) Inventors: Malolan Chetlur, Bangalore (IN); Umamaheswari Devi, Bangalore (IN); Shivkumar Kalyanaraman, Bangalore (IN); Ravindranath Kokku, Bangalore (IN); Kunal Korgaonkar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 13/538,959

(22) Filed: Jun. 29, 2012

(65) Prior Publication Data

US 2014/0006950 A1    Jan. 2, 2014

(51) Int. Cl.
*G11B 27/34* (2006.01)
*H04H 60/43* (2008.01)
*G06F 3/01* (2006.01)
*H04N 21/472* (2011.01)
*H04N 21/24* (2011.01)
*H04N 21/25* (2011.01)
*G06Q 30/06* (2012.01)

(52) U.S. Cl.
CPC .............. *G06F 3/01* (2013.01); *G06Q 30/0631* (2013.01); *H04N 21/2407* (2013.01); *H04N 21/251* (2013.01); *H04N 21/47202* (2013.01)

(58) Field of Classification Search
USPC .............. 715/719, 716, 738; 725/51, 101, 87; 711/137
See application file for complete search history.

(56) References Cited

U.S. PATENT DOCUMENTS

| 6,085,193 | A | 7/2000 | Malkin |
| 6,553,461 | B1 | 4/2003 | Gupta |
| 6,993,591 | B1 * | 1/2006 | Klemm ......................... 709/232 |
| 7,107,406 | B2 | 9/2006 | Kurasugi |

(Continued)

FOREIGN PATENT DOCUMENTS

WO    WO2009005620 A2    1/2009
WO    WO2013150378 A1    10/2013

OTHER PUBLICATIONS

Bestavros, Azer, "Speculative Data Dissemination and Service to Reduce Server Load, Network Traffic and Service Time in Distributed Information Systems," Proceedings of ICDE '96: The 1996 International Conference on Data Engineering, New Orleans, Louisiana, USA, Mar. 1996, 8 pages.

(Continued)

*Primary Examiner* — Jennifer To
*Assistant Examiner* — Jasmine Wan
(74) *Attorney, Agent, or Firm* — Ference & Asociates LLC (57) ABSTRACT

Methods and arrangements for video delivery preparation. A video, being accessible online, is displayed at an interface in response to a user request. A relative probability of video access by the user with respect to at least two other online-accessible videos is qualitatively determined. An ordered prediction set is created with respect to the other videos. The other videos are prepared incrementally based on the prediction set, so that the user is able to access and view the videos. The preparing includes preparing a first one of the other videos over a first time period and a second one of the other videos over a second time period, wherein at least a portion of the first time period is coincident with at least a portion of the second time period. An element is displayed at the interface which provides a connection to at least one of the other videos.

19 Claims, 7 Drawing Sheets

(56) References Cited

U.S. PATENT DOCUMENTS

| | | |
|---|---|---|
| 7,418,494 B2 | 8/2008 | Dahin |
| 7,446,795 B2 | 11/2008 | Rengaraju et al. |
| 7,516,238 B2 | 4/2009 | Key |
| 7,647,225 B2 * | 1/2010 | Bennett et al. ............... 704/251 |
| 7,757,002 B2 | 7/2010 | Penton |
| 7,809,818 B2 | 10/2010 | Plamondon |
| 7,958,316 B2 * | 6/2011 | Speight et al. ............... 711/137 |
| 7,966,632 B1 | 6/2011 | Pan |
| 8,028,081 B2 | 9/2011 | Kandekar |
| 8,302,030 B2 * | 10/2012 | Soroca et al. ............... 715/810 |
| 8,468,244 B2 * | 6/2013 | Redlich et al. ............... 709/225 |
| 2002/0124259 A1 * | 9/2002 | Chang et al. ............... 725/91 |
| 2002/0133830 A1 * | 9/2002 | Kim et al. ............... 725/142 |
| 2004/0088375 A1 | 5/2004 | Sethi |
| 2005/0125533 A1 * | 6/2005 | Svanbro et al. ............. 709/225 |
| 2008/0046946 A1 | 2/2008 | Diroo et al. |
| 2008/0222244 A1 | 9/2008 | Huang |
| 2008/0228772 A1 * | 9/2008 | Plamondon ................... 707/10 |
| 2008/0228864 A1 | 9/2008 | Plamondon |
| 2008/0301300 A1 | 12/2008 | Toub |
| 2009/0006368 A1 * | 1/2009 | Mei et al. .......................... 707/5 |
| 2009/0234878 A1 * | 9/2009 | Herz et al. ................... 707/102 |
| 2009/0249421 A1 | 10/2009 | Liu et al. |
| 2009/0287842 A1 | 11/2009 | Plamondon |
| 2010/0005084 A1 * | 1/2010 | Nguyen et al. ................... 707/5 |
| 2010/0005424 A1 * | 1/2010 | Sundaresan et al. .......... 715/849 |
| 2010/0185382 A1 * | 7/2010 | Barker et al. ................. 701/119 |
| 2011/0035141 A1 * | 2/2011 | Barker et al. ................. 701/119 |
| 2012/0151511 A1 * | 6/2012 | Bernard et al. ................. 725/10 |
| 2012/0167127 A1 * | 6/2012 | Uchida et al. ................... 725/14 |
| 2012/0289147 A1 * | 11/2012 | Raleigh et al. ............... 455/3.06 |
| 2012/0290950 A1 * | 11/2012 | Rapaport et al. ............. 715/753 |
| 2013/0238751 A1 * | 9/2013 | Raleigh et al. ................ 709/217 |
| 2013/0259442 A1 * | 10/2013 | Bloch et al. ................... 386/230 |

OTHER PUBLICATIONS

Duchamp, Dan, "Prefetching Hyperlinks," Proceedings of USITS '99: The 2nd USENIX Symposium on Internet Technologies & Systems, Boulder, Colorado, USA, Oct. 11-14, 1999, 13 pages, USENIX Association.

Markatos, Evangelos P., et al., "A Top-10 Approach to Prefetching on the Web,"Technical Report 173, ICS-Forth, Aug. 1996, 15 pages.

Reisslein, Martin, et al., "A Join-the-Shortest-Queue Prefetching Protocol for VBR Video on Demand," Proceedings of the 1997 International Conference on Network Protocols, Atlanta, Georgia, USA, Oct. 28-31, 1997, pp. 63-72, IEEE Digital Library.

Wang, Z., et al., "Prefetching Strategy in Peer-Assisted Social Video Streaming", ACM Multi Media 2011 Conference, Nov. 28-Dec. 1, 2011, 4 pages, ACM, Scottsdale, Arizona, USA.

Kemmarat, S., et al., "Watching User Generated Videos with Prefetching", ACM Multi Media Systems Conference, Feb. 23-25, 2011, 12 pages, San Jose, California, USA.

International Search Report for PCT/IB2013/054498, Nov. 7, 2013, 1 page, The State Intellectual Property Office, the P.R. China, Haidian District, Beijing, China.

* cited by examiner

INCREMENTAL PREPARATION OF VIDEOS FOR DELIVERY

BACKGROUND

Online video streaming has become extremely popular for users, allowing them to view high-quality video content on a desktop computer, laptop/tablet computer or other mobile device (e.g., a mobile phone such as a smart phone). Attempts are often made to anticipate a user's access to, or desire to access, one or more videos at a future timepoint. For instance, users may often surf video sites through reference (or recommendation) links, inasmuch as a content provider offers such links alongside a video that a user has already chosen and may be watching.

It is often recognized that there is a much greater likelihood of a user viewing a video suggested or offered through such links as opposed to one that would need to be accessed through another mechanism (e.g., typing out another search string). However, such video objects pointed to by the recommendation links are usually brought about through a standard and non-customized protocol, and considerable resources can be ultimately wasted if indeed one or more users choose not to view videos that are accessible from such links.

BRIEF SUMMARY

In summary, one aspect of the invention provides a method comprising: displaying a video at an interface in response to a user request, the video being accessible online; quantitatively determining a relative probability of video access by the user with respect to at least two other videos that are accessible online; creating an ordered prediction set with respect to the at least two other videos; preparing the at least two other videos incrementally based on the prediction set, so that the user is able to access and view the at least two videos; the preparing comprising preparing a first one of the at least two other videos over a first time period and a second one of the at least two other videos over a second time period, wherein at least a portion of the first time period is coincident with at least a portion of the second time period; and displaying at the interface an element which provides a connection to at least one of the at least two other videos.

Another aspect of the invention provides an apparatus comprising: at least one processor; and a computer readable storage medium having computer readable program code embodied therewith and executable by the at least one processor, the computer readable program code comprising: computer readable program code configured to display a video at an interface in response to a user request, the video being accessible online; computer readable program code configured to quantitatively determine a relative probability of video access by the user with respect to at least two other videos that are accessible online; computer readable program code configured to create an ordered prediction set with respect to the at least two other videos; computer readable program code configured to prepare the at least two other videos incrementally based on the prediction set, so that the user is able to access and view the at least two videos; computer readable program code configured to prepare a first one of the at least two other videos over a first time period and a second one of the at least two other videos over a second time period, wherein at least a portion of the first time period is coincident with at least a portion of the second time period; and computer readable program code configured to display at the interface an element which provides a connection to at least one of the at least two other videos.

An additional aspect of the invention provides a computer program product comprising: a computer readable storage medium having computer readable program code embodied therewith, the computer readable program code comprising: computer readable program code configured to display a video at an interface in response to a user request, the video being accessible online; computer readable program code configured to quantitatively determine a relative probability of video access by the user with respect to at least two other videos that are accessible online; computer readable program code configured to create an ordered prediction set with respect to the at least two other videos; computer readable program code configured to prepare the at least two other videos incrementally based on the prediction set, so that the user is able to access and view the at least two videos; computer readable program code configured to prepare a first one of the at least two other videos over a first time period and a second one of the at least two other videos over a second time period, wherein at least a portion of the first time period is coincident with at least a portion of the second time period; and computer readable program code configured to display at the interface an element which provides a connection to at least one of the at least two other videos.

A further aspect of the invention provides a method comprising: displaying an active video at an interface in response to a user request, the active video being accessible online; learning, in realtime, probabilities of the user accessing at least two other videos that are accessible online; creating a prediction set comprising the at least two other videos; establishing functional pointers between the active video and the at least two other videos in the prediction set; displaying at the interface at least one element which triggers the functional pointers; and incrementally preparing the at least two other videos, so that the user is able to access and view the at least two videos, as a function of the learned probabilities.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 7. In accordance with an example embodiment, most if not all of the process steps, components and outputs discussed with respect to FIGS. 1-5 can be performed or utilized by way of a processing unit or units and system memory such as those indicated, respectively, at 16' and 28' in FIG. 7, whether on a server computer, a client computer, a node computer in a distributed network, or any combination thereof.

Figure 1:
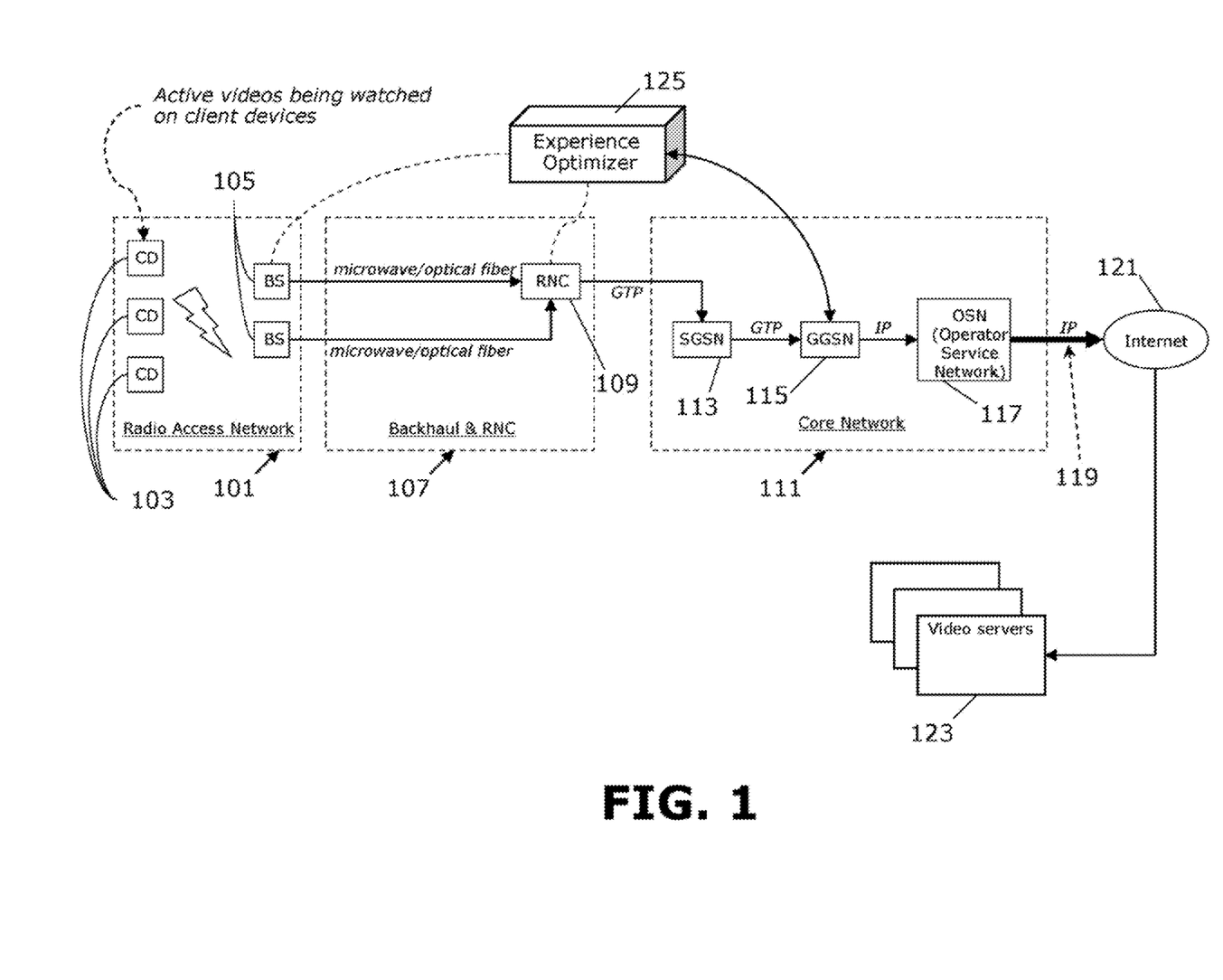
FIG. 1 schematically illustrates a general system architecture.
Figure 3:
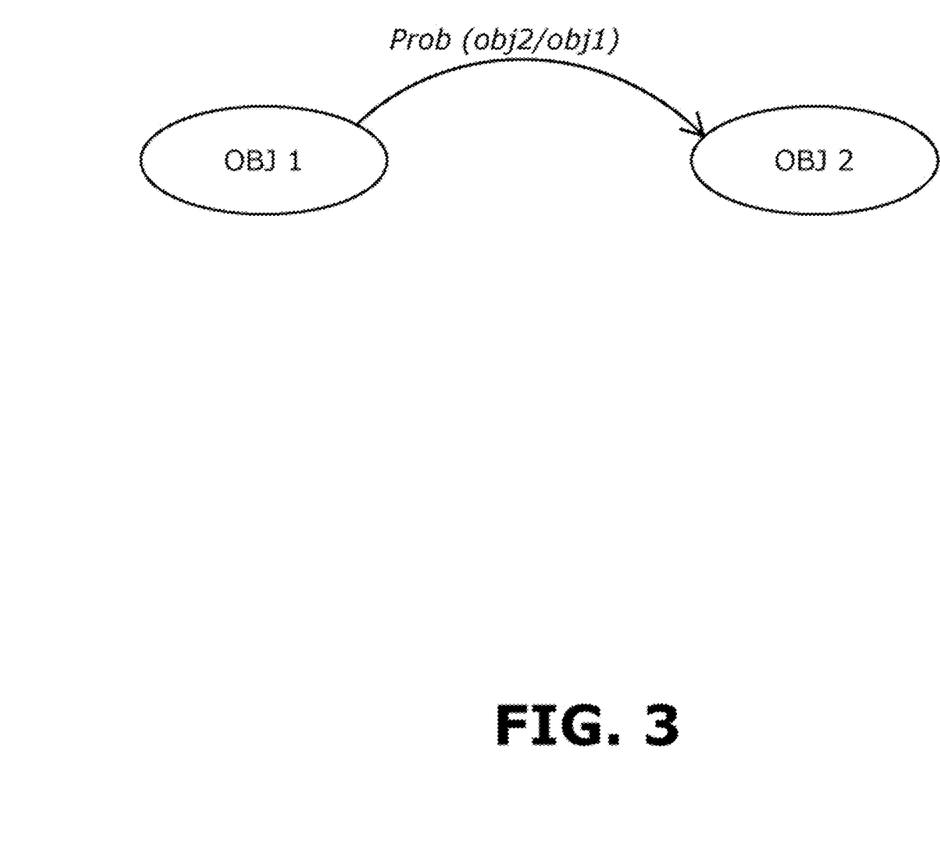
FIG. 3 schematically illustrates a process of real-time analytics.
Figure 4:
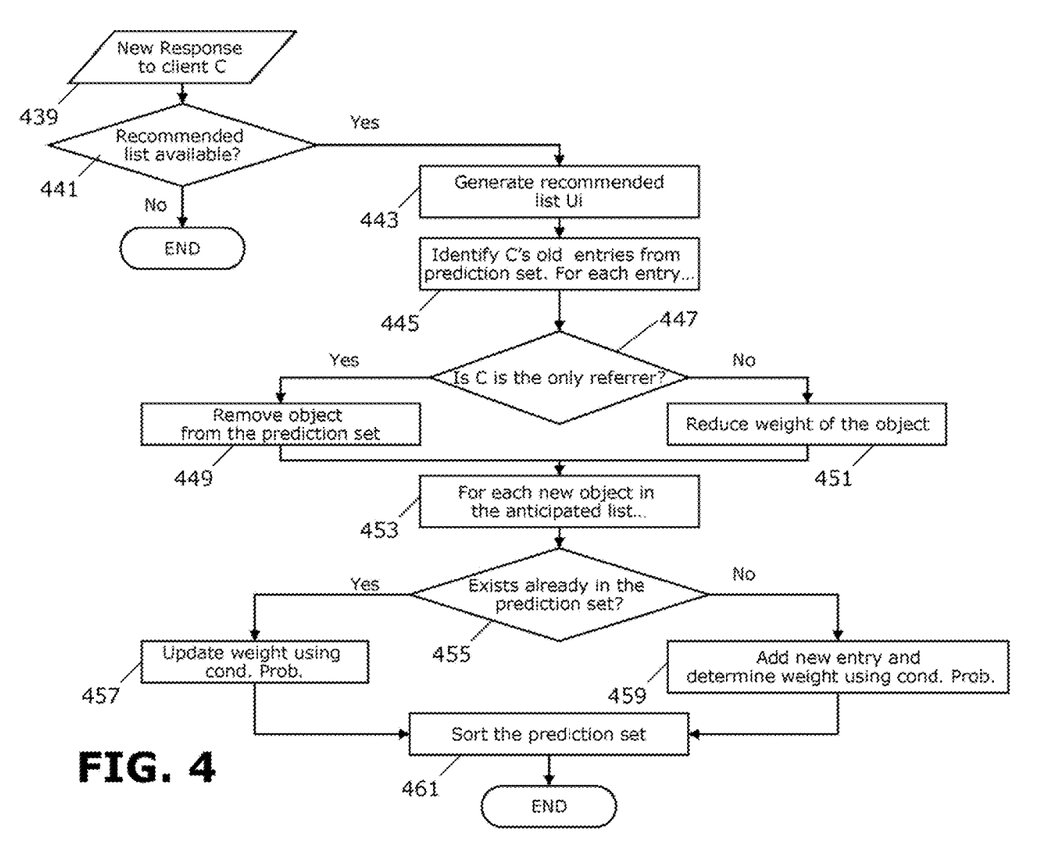
FIG. 4 schematically illustrates a process of weight computation.
Figure 5:
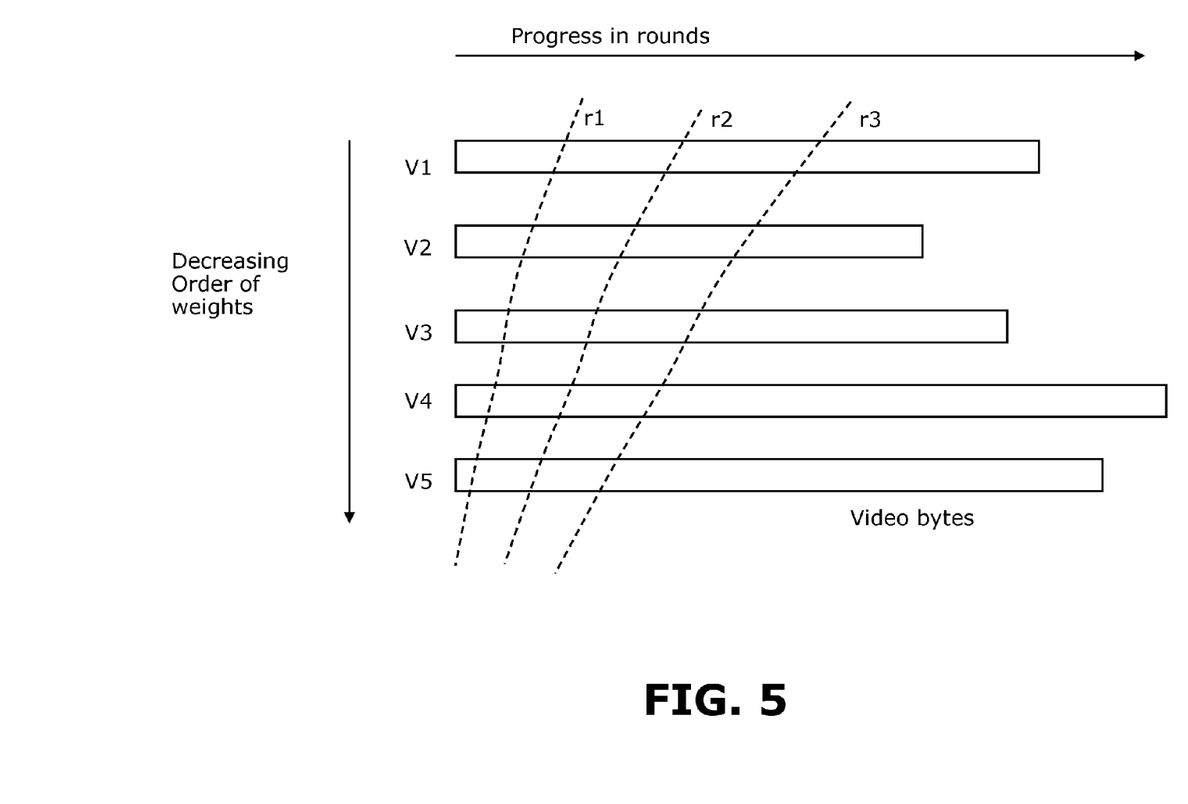
FIG. 5 graphically illustrates solution progress of a process of incremental object fetching.

To facilitate easier reference, in advancing from FIG. 1 to and through FIG. 5, a reference numeral is advanced by a multiple of 100 in indicating a substantially similar or analogous component or element with respect to at least one component or element found in at least one earlier figure among FIGS. 1-5.

In a context of at least one embodiment of the invention, it can be appreciated that early preparation of videos can improve user experience. Preparation can involve predictively fetching from the video servers, transcoding already fetched content, and/or predictively fetching and transcoding. Early preparation reduces access latency, and doing so using only spare resources reduces overall demand load on the processing and network infrastructure. However, it is hard to predict with 100% accuracy if an object will be actually requested. Inasmuch as early preparation can be wasteful, then it becomes desirable to reduce or avert such wasting.

As such, in accordance with at least one embodiment of the invention, let the set of videos currently viewed by users in a network be called active videos. Additionally, the popular objects accessed within the last T units of time, although not currently active, can be included, although we do not consider the extension here. Let the recommended videos for each of the video in the active set be called the prediction set. As such, methods and systems as broadly contemplated herein may: continuously learn in real-time the relative chance of access of objects based on active set of videos, and assign weights dynamically; prepare videos incrementally from the prediction set in a network-wide priory order, defined by the weights (as will be more fully appreciated and understood herebelow); cancel the preparation of videos that are no longer relevant since the user clicks on a different video, or sufficient time has elapsed; and prepare videos using only spare network and processing resources.

FIG. 1 schematically illustrates a general system architecture, in accordance with at least one embodiment of the invention. As shown, in a radio access network 101, client devices (CD) 103 are communicatively in contact with base stations (BS) 105. The base stations are connected to a backhaul and RNC (Radio Network Control) portion 107, wherein a link (such as a microwave and/or optical fiber link) connects each base station with the RNC 109. The RNC 109 is connected to an SGSN (Serving GPRS [General Packet Radio Service] Support Node) 113 of a core network 111 via a GTP (GPRS tunneling protocol) link. Also included in core network 111 are a GGSN (Gateway GPRS Support Node) 115 connected via a GTP to the SGSN 113, and also to an OSN (Operator Service Network) 117 via an IP (Internet Protocol) link. For its part, the OSN 117 is connected via an external link 119 to the internet 121, itself in communicative contact with given video servers 123.

In accordance with at least one embodiment of the invention, an experience optimizer 125 is provided to facilitate video delivery scheduling. Thus, inasmuch as active videos may be watched on CDs 103, optimizer 125 can assist in managing video delivery to CDs 103, especially in view of the expense normally associated with maintaining external IP connection 119 with the internet 121. Optimizer 125 can be deployed at GGSN 115 but, alternatively, may be deployed at other locations such as RNC 109 or a BS 105.

Figure 2:
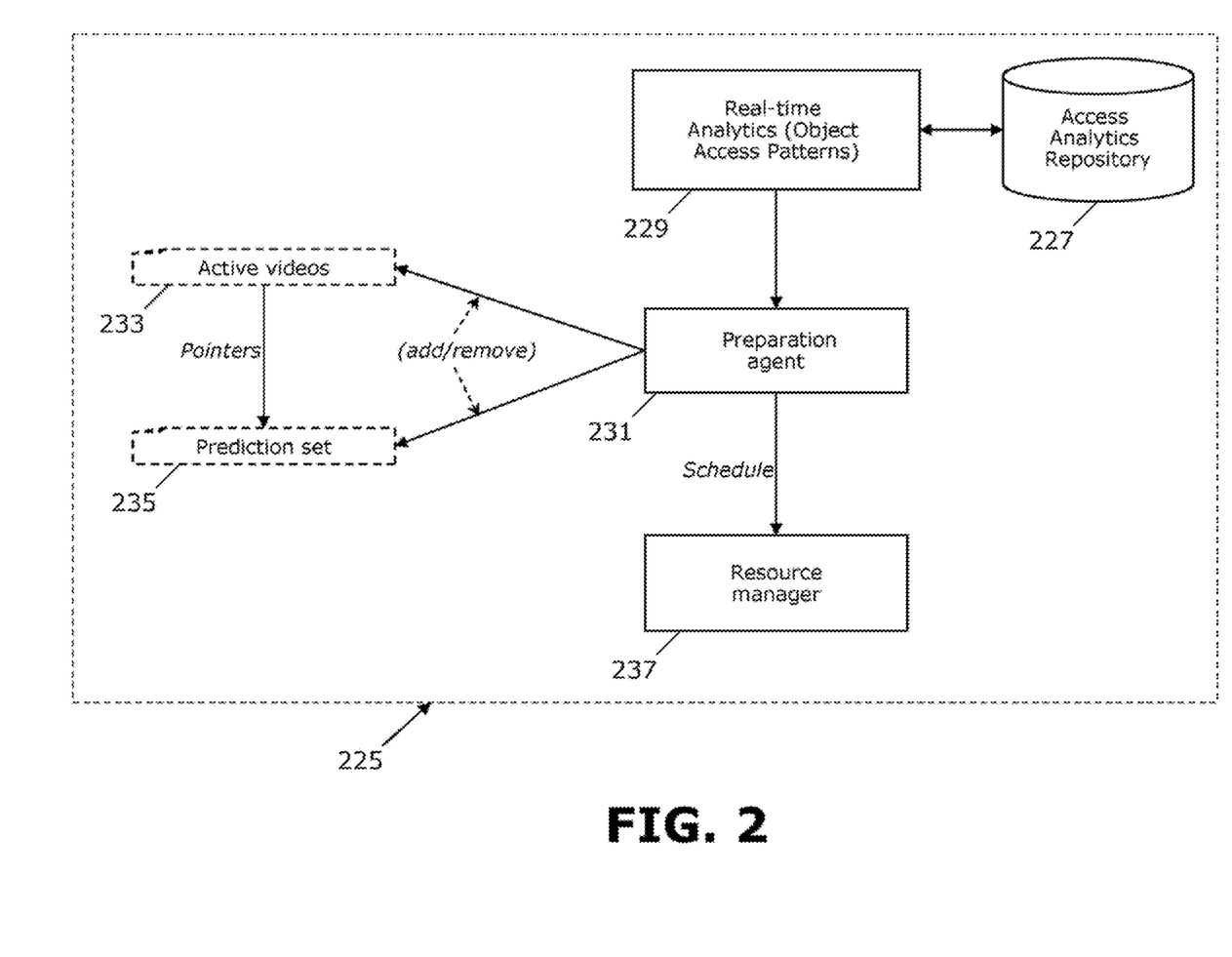
FIG. 2 schematically illustrates details of an experience optimizer.

FIG. 2 schematically illustrates details of an experience optimizer 225 in accordance with at least one embodiment of the invention. An access analytics repository 227 is accessed by a module 229 which conducts real-time analytics (with respect to object access patterns, or patterns of access to videos by users). The resulting analysis is transmitted to a preparation agent 231 which identifies active videos 233 and generates pointers to a prediction set 235, and serves to add or remove videos from consideration in either set, in a manner discussed in further detail herebelow. Preparation agent 231 also works with a resource manager 237 for the purpose of scheduling video delivery. The resource manager 237 communicates with a network resource scheduler such as a bandwidth shaper (in case of data prefetching) or a processor scheduler (in case of video transcoding) to ensure that bandwidth and/or processing resources are appropriately allocated to preparation activities as determined by the preparation agent 231.

In accordance with at least one embodiment of the invention, the experience optimizer 225 keeps track of, for each object, the probability of it being accessed in view of its reference object is being viewed currently. FIG. 3 schematically illustrates a process of real-time analytics, as may be conducted by module 229 in FIG. 2; continued reference may be made to both FIGS. 2 and 3. As such, module 229 learns that OBJ1 was accessed X times, and that every time OBJ1 was accessed, OBJ2 was accessed Y times Prob(obj2/obj1)=Y/X. This conditional probability information can also be maintained by the end server(s) (e.g., where indicated at 123 in FIG. 1), and the experience optimizer 225 can fetch it from there. The conditional probabilities are then used to assign weights to objects at the preparation agent 231. Probability is computed on a per-object basis without other objects in consideration, but a computed priority order ends up being valid across all objects, thereby leading to a very simple computation of network-wide weights. The relative weights of objects can also be determined based on each individual user's access history, time of day, user preferences, gender, and other analytics.

FIG. 4 schematically illustrates a process of weight computation, in accordance with at least one embodiment of the invention; continued reference may also be made to FIG. 2. Upon each new active object response to a client C 439 (either from the server or from the experience optimizer 225 itself), if (441) a recommendation list is identifiable from the response, then there is generated (443) the eligible "anticipated" video list $\{u_i\}$ for a currently viewed video v (from among active videos 233), and it is added to the prediction set 235. For each old video p identified (445) in the prediction set 235 that belongs to C, if (447) C is the only referrer for the video, it is removed (449) from the prediction set 235. Else, its WEIGHT is reduced (451) by the conditional probability contributed by C's previous active video q, i.e. WEIGHT(p)−=P(p/q).

In accordance with at least one embodiment of the invention, for each newly eligible video (that is, each new object identified [453] in the anticipated lists), if (455) it exists already in the prediction set 235, then the corresponding weight is updated (457) such that WEIGHT($u_i$)+=P($u_i$/v). Else, newly eligible videos are added (459) to the prediction set 235, and weight is set such that WEIGHT($u_i$)=P($u_i$/v). The active video v and client ID C are then added to the active list 233, and pointers from the active video are added to the corresponding anticipated videos $\{u_i\}$ in the prediction set 235. The prediction set is then sorted (461) in decreasing order of weights. On completion of the object preparation, the object is removed from the prediction set.

In accordance with an illustrative and non-restrictive example according to least one embodiment of the invention, using a preparation agent's incremental and predictive object fetching procedure, the following problem can be solved. Given a capacity C available for fetching recommended videos in an interval I in which no new objects are added to the prediction list, determine how many chunks of object i (in the prediction set) need to be fetched such that the average latency in satisfying future requests to these objects and the bandwidth required in fetching them is balanced. In an associated optimization framework, let $w_i$ denote the weight of object i in the prediction set. Without loss of generality, let $w_i \geq w_{i+i}$, for all i. Let $S_b(\cdot)$ denote the bandwidth/network savings function and $S_l(\cdot)$ the latency-related savings function. Then, the number of chunks $c_i$ to fetch for object i, for all i, can be obtained as a solution to the following maximization problem:

$$\text{Maximize} \sum_{i=1}^{n} w_i \times (S_b(c_i) + S_l(c_i))$$

$$\text{subject to} \sum_{i=1}^{n} c_i \leq C$$

Accordingly, FIG. 5 graphically illustrates the solution progress of this process of incremental object fetching. It can be seen that in any given increment or round r higher-weight videos get fetched (e.g., prepared) more incrementally than lower-weight videos. As shown, the weights of the five videos (from highest to lowest) are V1, V2, V3, V4, and V5. As shown, in each round (or increment) r1, r2, etc., the amount of video V1 fetched is greater than the amount of video V2 fetched, the amount of video V2 fetched is greater than the amount of video V3 fetched, the amount of video V3 fetched is greater than the amount of video V4 fetched, and the amount of video V4 fetched is greater than the amount of video V5 fetched.

In accordance with at least one embodiment of the invention, two implementations of an object fetching procedure are conceivable. In a greedy solution, objects are fetched in a weighted round robin manner (using their weights). This finds a tradeoff point between resource usage and object access latency, and can be achieved using receiver-side buffer control, or issuing multiple range requests. Dynamic changes to the prediction set can be seamlessly accommodated.

In another object fetching solution, in accordance with at least one embodiment of the invention, an optimization solver is employed. Here, the solution to an optimization problem will depend on the bandwidth and latency savings functions, which can be defined on a case by case basis. This problem can be solved dynamically, every time the prediction set changes. The same approach is applicable for transcoding.

In accordance with at least one embodiment of the invention, a resource manager 237 is employed. As such, the fetching of recommended videos is done using only spare resources via an expensive external link (e.g., as indicated at 119 in FIG. 1) or on the processing infrastructure (in case of transcoding). For spare network resources, this can be done in multiple ways, including: variants of background transfer protocols such as the one disclosed in U.S. Pat. No. 7,418,494 titled "Method and System for Background Replication of Data Objects", in U.S. Pat. No. 7,516,238 titled "Background Transport Service" and "TCP-LP: A Distributed Algorithm for Low Priority Data Transfer. Infocom 2003". Monitoring bandwidth usage on the external link and scheduling only enough prefetch requests to minimize the impact on active requests (i.e. adaptive rate limiting of prefetch requests).

Figure 6:
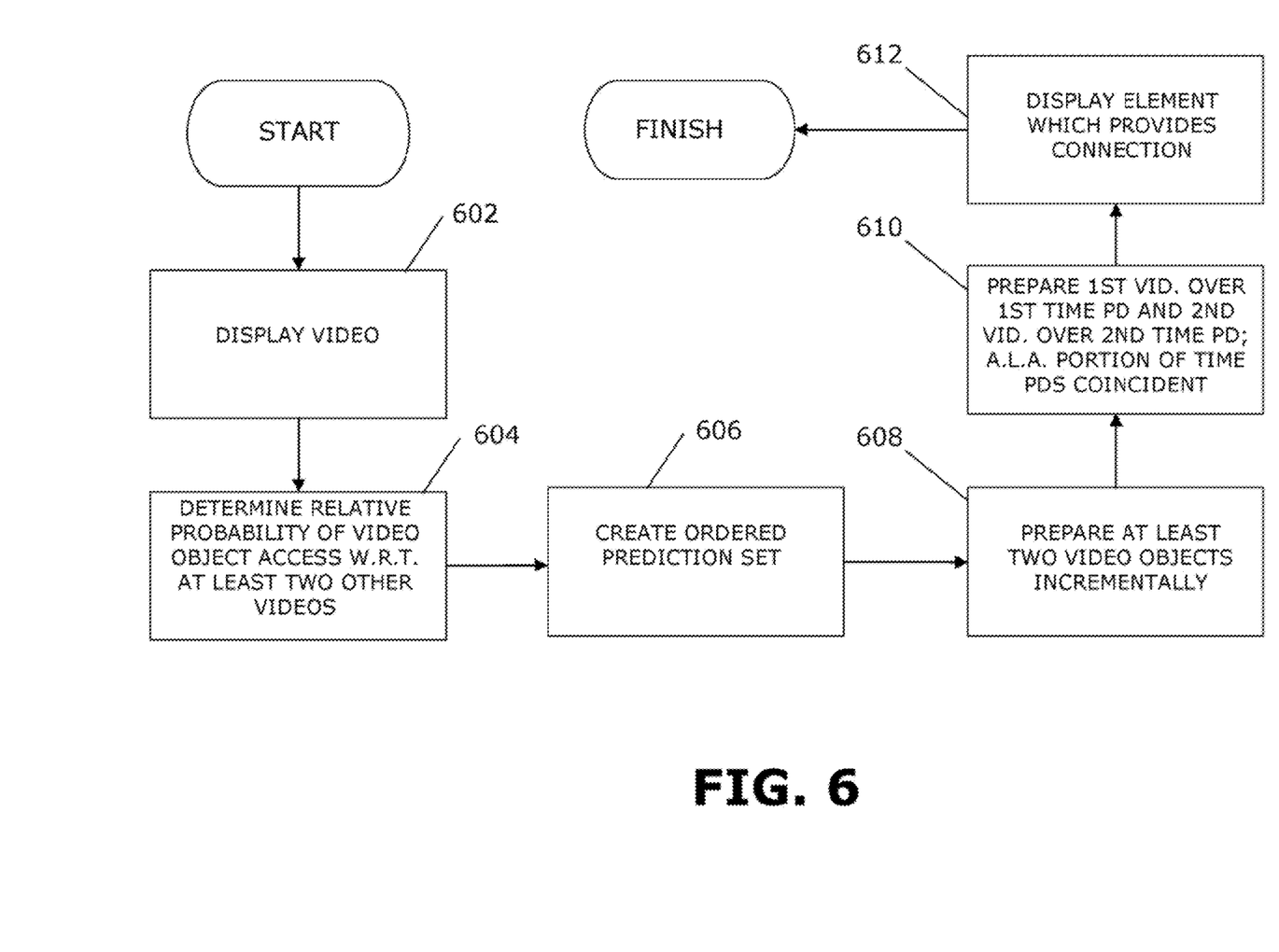
FIG. 6 sets forth a process more generally for video delivery preparation.

FIG. 6 sets forth a process more generally for video delivery preparation, in accordance with at least one embodiment of the invention. It should be appreciated that a process such as that broadly illustrated in FIG. 6 can be carried out on essentially any suitable computer system or set of computer systems, which may, by way of an illustrative and non-restrictive example, include a system such as that indicated at 12' in FIG. 7. In accordance with an example embodiment, most if not all of the process steps discussed with respect to FIG. 6 can be performed by way a processing unit or units and system memory such as those indicated, respectively, at 16' and 28' in FIG. 7.

As shown in FIG. 6, in accordance with at least one embodiment of the invention, a video is displayed at an interface in response to a user request, the video being accessible online (602). A relative probability of video access by the user with respect to at least two other videos, that are accessible online, is qualitatively determined (604). An ordered prediction set is created with respect to the at least two other videos (606). The at least two other videos are prepared incrementally based on the prediction set, so that the user is able to access and view the at least two videos (608). The preparing includes preparing a first one of the at least two other videos over a first time period and a second one of the at least two other videos over a second time period, wherein at least a portion of the first time period is coincident with at least a portion of the second time period (610). An element is displayed at the interface which provides a connection to at least one of the at least two other videos (612).

Figure 7:
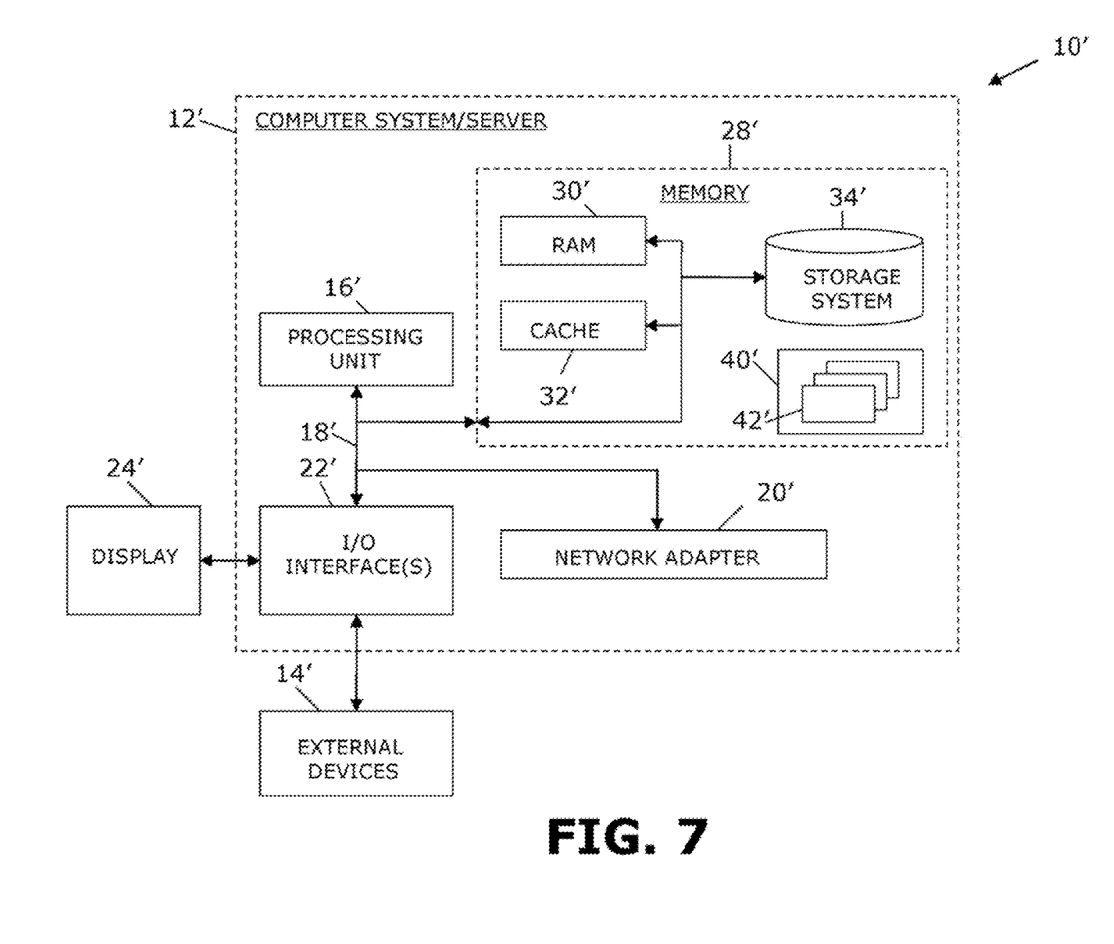
FIG. 7 illustrates a computer system.

Referring now to FIG. 7, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:
1. A method comprising:
   displaying a video at an interface in response to a user request, the video being accessible online;
   quantitatively determining a relative probability of video access by the user with respect to at least two other videos that are accessible online, wherein the relative probability of video access by the user is determined on a per video basis, and wherein the determining comprises using previous selection correlation data;
   creating an ordered prediction set with respect to the at least two other videos;
   preparing the at least two other videos in increments based on the prediction set, so that the user is able to access and view the at least two videos, wherein an increment comprises a calculated amount of video;
   said preparing being performed as a function of the relative probability of video access determined with respect to each of the at least two videos, wherein over a predetermined interval the amount of a video with a higher probability of video access prepared is more than the amount of a video with a lower probability of video access, the predetermined interval being a segment of a total time required for preparing an entirety of the at least two other videos;
   said preparing comprising preparing a first one of the at least two other videos over a first time period and a second one of the at least two other videos over a second time period, wherein at least a portion of the first time period is coincident with at least a portion of the second time period; and
displaying at the interface an element which provides a connection to at least one of the at least two other videos.

2. The method according to claim 1, wherein said determining is performed during said displaying.

3. The method according to claim 1, wherein said creating comprises making use of a weight-defined order.

4. The method according to claim 1, wherein said creating comprises consulting a network-wide priority order.

5. The method according to claim 1, wherein said creating comprises dynamically assigning weights to the at least two other videos in response to said determining of a relative probability.

6. The method according to claim 5, wherein:
the relative probability derives from a probability of access to a video based on at least one currently active video; and
the weights derive from the probability of access to a video based on at least one currently active video.

7. The method according to claim 1, comprising cancelling preparation of at least one of the at least two other videos in response to at least one prompt.

8. The method according to claim 7, wherein the at least one prompt includes at least one prompt selected from the group consisting of: a user click on a different video object; and elapse of a predetermined time period.

9. The method according to claim 1, wherein said preparing comprises employing solely spare network and processing resources.

10. The method according to claim 1, wherein said incremental preparing comprises:
employing weighted round robin scheduling across the at least two other videos; and
undertaking incremental preparation of each of the at least two other videos in accordance with the weighted round robin scheduling.

11. An apparatus comprising:
at least one processor; and
a computer readable storage medium having computer readable program code embodied therewith and executable by the at least one processor, the computer readable program code comprising:
computer readable program code configured to display a video at an interface in response to a user request, the video being accessible online;
computer readable program code configured to quantitatively determine a relative probability of video access by the user with respect to at least two other videos that are accessible online, wherein the relative probability of video access by the user is determined on a per video basis, and wherein the determining comprises using previous selection correlation data;
computer readable program code configured to create an ordered prediction set with respect to the at least two other videos;
computer readable program code configured to prepare the at least two other videos in increments based on the prediction set, so that the user is able to access and view the at least two videos, wherein an increment comprises a calculated amount of video;
the preparing being performed as a function of the relative probability of video access determined with respect to each of the at least two videos, wherein over a predetermined interval the amount of a video with a higher probability of video access prepared is more than the amount of a video with a lower probability of video access, the predetermined interval being a segment of a total time required for preparing an entirety of the at least two other videos;
computer readable program code configured to prepare a first one of the at least two other videos over a first time period and a second one of the at least two other videos over a second time period, wherein at least a portion of the first time period is coincident with at least a portion of the second time period; and
computer readable program code configured to display at the interface an element which provides a connection to at least one of the at least two other videos.

12. A computer program product comprising:
a non-transitory computer readable storage medium having computer readable program code embodied therewith, the computer readable program code comprising:
computer readable program code configured to display a video at an interface in response to a user request, the video being accessible online;
computer readable program code configured to quantitatively determine a relative probability of video access by the user with respect to at least two other videos that are accessible online, wherein the relative probability of video access by the user is determined on a per video basis, and wherein the determining comprises using previous selection correlation data;
computer readable program code configured to create an ordered prediction set with respect to the at least two other videos;
computer readable program code configured to prepare the at least two other videos in increments based on the prediction set, so that the user is able to access and view the at least two videos, wherein an increment comprises a calculated amount of video;
the preparing being performed as a function of the relative probability of video access determined with respect to each of the at least two videos, wherein over a predetermined interval the amount of a video with a higher probability of video access prepared is more than the amount of a video with a lower probability of video access, the predetermined interval being a segment of a total time required for preparing an entirety of the at least two other videos;
computer readable program code configured to prepare a first one of the at least two other videos over a first time period and a second one of the at least two other videos over a second time period, wherein at least a portion of the first time period is coincident with at least a portion of the second time period; and
computer readable program code configured to display at the interface an element which provides a connection to at least one of the at least two other videos.

13. The computer program product according to claim 12, wherein said computer readable program code is configured to determine the relative probability in realtime.

14. The computer program product according to claim 12, wherein said computer readable program code is configured to create the ordered prediction set via making use of a weight-defined order.

15. The computer program product according to claim 12, wherein said computer readable program code is configured to create the ordered prediction set via consulting a network-wide priority order.

16. The computer program product according to claim 12, wherein said computer readable program code is configured to dynamically assign weights to the at least two other videos in response to the determining of a relative probability.

17. The computer program product according to claim 12, wherein said computer readable program code is configured to cancel preparation of at least one of the at least two other videos in response to at least one prompt.

18. The computer program product according to claim 12, wherein said computer readable program code is configured to employ solely spare network and processing resources in preparing the at least two videos.

19. The computer program product according to claim 12, wherein said computer readable program code is configured to prepare incrementally via:
   employing weighted round robin scheduling across the at least two other videos; and
   undertaking incremental preparation of each of the at least two other videos in accordance with the weighted round robin scheduling.

* * * * *